United States Patent
Shiver et al.

(10) Patent No.: US 11,118,957 B2
(45) Date of Patent: Sep. 14, 2021

(54) LIQUID VOLUME DETERMINATION TO AFFECT FUNCTIONALITY OF A SMART ENVIRONMENT

(71) Applicant: International Business Machines Corporation, Armonk, NY (US)

(72) Inventors: Brent Shiver, Austin, TX (US); Susann Marie Keohane, Austin, TX (US); Fang Lu, Billerica, MA (US); Maureen Kraft, Hudson, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 462 days.

(21) Appl. No.: 16/211,356

(22) Filed: Dec. 6, 2018

(65) Prior Publication Data
US 2020/0182676 A1    Jun. 11, 2020

(51) Int. Cl.
| | |
|---|---|
| *G01F 22/00* | (2006.01) |
| *G06K 7/10* | (2006.01) |
| *G10L 25/51* | (2013.01) |
| *H04R 29/00* | (2006.01) |
| *H04R 1/40* | (2006.01) |

(52) U.S. Cl.
CPC ......... *G01F 22/00* (2013.01); *G06K 7/10366* (2013.01); *G10L 25/51* (2013.01); *H04R 1/406* (2013.01); *H04R 29/005* (2013.01)

(58) Field of Classification Search
CPC ......... B65D 47/32; G10L 25/51; H04R 1/406; H04R 29/005
USPC ............................... 702/55; 381/56–58, 92
See application file for complete search history.

(56) References Cited

U.S. PATENT DOCUMENTS

| | | | | |
|---|---|---|---|---|
| 5,404,903 A | * | 4/1995 | Anderson | B60P 3/2255 137/514.3 |
| 5,732,740 A | * | 3/1998 | Hornyack | F16L 55/053 138/26 |

(Continued)

FOREIGN PATENT DOCUMENTS

| | | |
|---|---|---|
| CN | 108089623 A | 5/2018 |
| DE | 102012218574 A1 | 4/2014 |

(Continued)

OTHER PUBLICATIONS

Do, Tuan "Panasonic Smart Kitchen Demo—Preview your Future Kitchen", Jan. 11, 2015, pp. 1-2, retrieved from https://www.youtube.com/watch?v=9Sohwn1xRAs.

(Continued)

*Primary Examiner* — Lun-See Lao
(74) *Attorney, Agent, or Firm* — Cantor Colburn LLP; Brian Welle

(57) ABSTRACT

A system and method for performing liquid volume determination in a smart environment, the method comprising involve determining that a liquid is being poured. The method includes identifying the liquid, and determining the liquid volume of the liquid being poured based on sound analysis of audio sensed by a microphone. A scenario in which the liquid is being poured is analyzed, and an action is determined based on the scenario. The action includes triggering an actuator of the smart environment, obtaining additional information about the liquid, or issuing an alert.

20 Claims, 3 Drawing Sheets

(56) References Cited

U.S. PATENT DOCUMENTS

| | | | | |
|---|---|---|---|---|
| 2011/0309103 A1* | 12/2011 | Heatherly | ................ | B67D 3/00 |
| | | | | 222/52 |
| 2014/0041449 A1* | 2/2014 | Lim | ........................ | G01F 23/30 |
| | | | | 73/309 |
| 2014/0048004 A1* | 2/2014 | Russick | .................. | B63B 13/00 |
| | | | | 114/183 R |
| 2014/0190879 A1* | 7/2014 | Young | ....................... | C02F 1/32 |
| | | | | 210/198.1 |

FOREIGN PATENT DOCUMENTS

| | | | |
|---|---|---|---|
| WO | 2013051823 A2 | 4/2013 | |
| WO | 2017209333 A1 | 12/2017 | |

OTHER PUBLICATIONS

Elgan, Mike "Coming Soon: Turn Your Kitchen Counter Into a Touch Screen", Apr. 30, 2013, pp. 1-14, retrieved from https://www.houzz.com/ideabooks/10395231/list/coming-soon-turn-your-kitchen-counter-into-a-touch-screen.

Magee, Christine "Fluid is a Smart Water Meter for Your Home", retrieved Nov. 28, 2018, pp. 1-4, retrieved from https://techcrunch.com/2015/09/15/fluid-is-a-smart-water-meter-for-your-home/.

Simonite, Tom "A Kitchen Countertop with a Brain", Jul. 2, 2010, pp. 1-3, retrieved from https://www.technologyreview.com/s/419639/a-kitchen-countertop-with-a-brain/.

Winston, Anna "Tipic's smart Tuler kitchen features a sink that appears with the wave of a hand", Apr. 20, 2016, pp. 1-10, retrieved from https://www.dezeen.com/2016/04/20/video-tipic-smart-tuler-kitchen-offmat-milan-design-week-2016-disappearing-sink-movie/.

\* cited by examiner

LIQUID VOLUME DETERMINATION TO AFFECT FUNCTIONALITY OF A SMART ENVIRONMENT

BACKGROUND

The present invention relates to a smart environment, and more specifically, to liquid volume determination to affect the functionality of a smart environment.

The interconnection of sensors, actuators, computing devices, appliances, vehicles, and any other communication-capable objects via the internet is referred to as the internet of things (IoT). IoT devices are increasingly used for remote management and monitoring. Thus, through IoT devices, any environment (e.g., home, nursing home, workplace) can be converted to a digital environment or, more generally, a smart environment. For example, lights and appliances in a home can be controlled remotely based on a network of connected appliances and devices.

SUMMARY

Embodiments of the present invention are directed to systems and methods to perform liquid volume determination in a smart environment. The method includes determining that a liquid is being poured, identifying the liquid, and determining the liquid volume of the liquid being poured based on sound analysis of audio sensed by a microphone. A scenario in which the liquid is being poured is analyzed, and an action is determined based on the scenario. The action includes triggering an actuator of the smart environment, obtaining additional information about the liquid, or issuing an alert.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

As previously noted, IoT devices can be used to create smart environments that facilitate remote management and monitoring. One of the types of activities that benefit from management and monitoring are activities involving liquids. The one or more embodiments of the invention that are detailed herein relate to liquid volume determination to affect the functionality of a smart environment. Specifically, a liquid can be identified (e.g., type, viscosity) based on a variety of different IoT devices, microphones can be used to determine a volume of the liquid that was dispensed, and the particular scenario involving the liquid can be analyzed to determine the best course of action (e.g., automated action, issuance of a warning). Determination of the scenario can involve using information from a number of IoT devices. While a smart home environment is specifically discussed for explanatory purposes, the embodiments of the invention that are discussed herein are applicable, as well, in other smart environments such as, for example, a group home, a manufacturing facility, or an office environment. In a smart home environment, for example, the dispensing of liquids (e.g., a beverage into a cup, oil into a hot pan, water into a tub) can be monitored for a number of purposes. A vision-impaired occupant of the smart home can be alerted when a beverage being poured into a cup is nearly overflowing. A tub overflow can be avoided, as well. If water is flowing into the tub while the only occupant of the smart home is exiting, that person can be alerted, for example. If oil is overheating in a pan, the stove can be turned off automatically, as another example.

Figure 1:
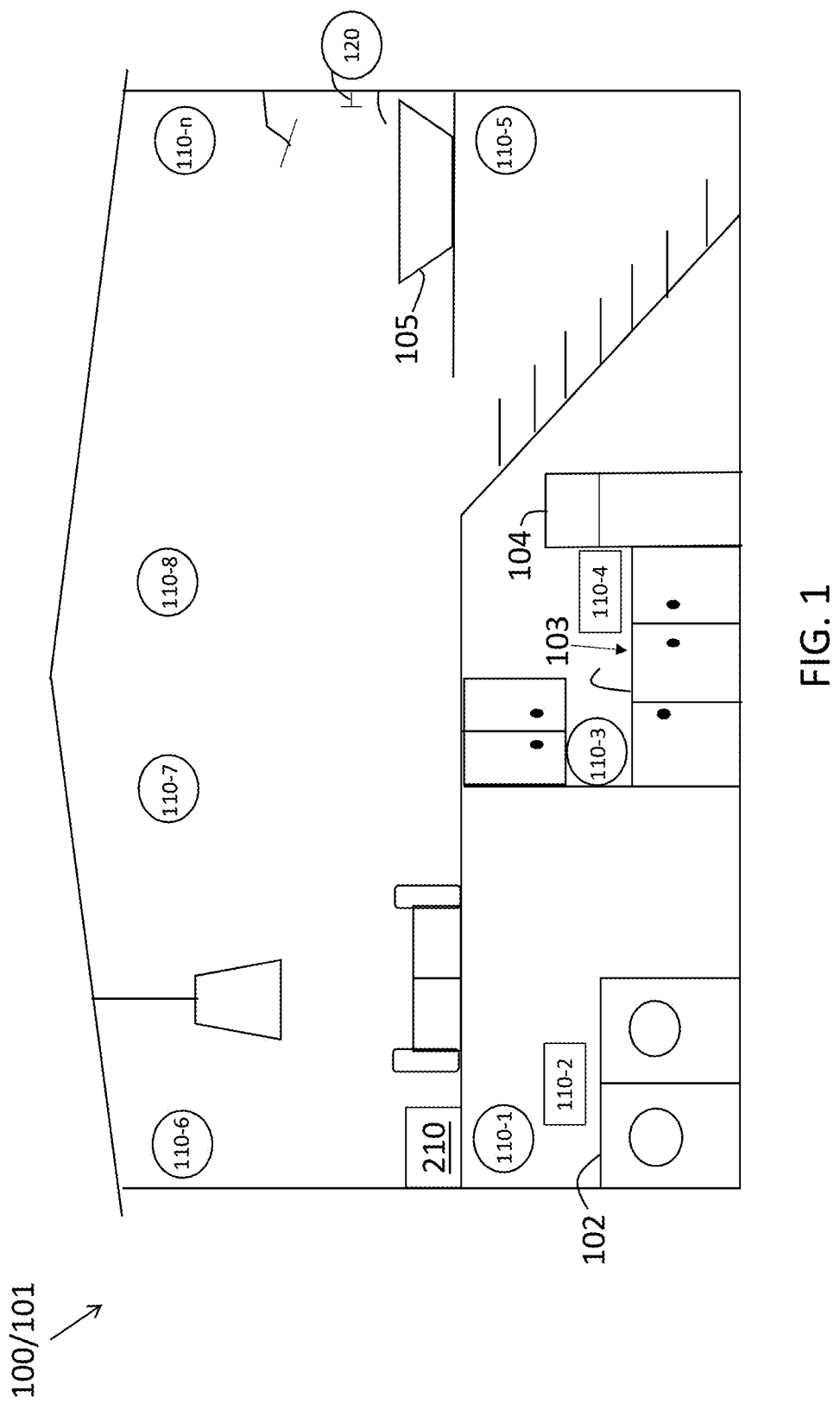
FIG. 1 is a cross-sectional view of an exemplary smart environment in which liquid volume is determined in order to affect functionality according to one or more embodiments of the invention.

FIG. 1 is a cross-sectional view of an exemplary smart environment 100 in which liquid volume is determined in order to affect the functionality of the smart environment 100 according to one or more embodiments of the invention. The exemplary smart environment 100 is a smart home 101. The exemplary sensors 110-1 through 110-n (generally referred to as 110) can be different types of sensors 110 and can be affixed to walls, appliances, or other supports in the smart environment 100. In an exemplary scenario, sensors 110-1, 110-5, and 110-6 can be motion sensors, sensors 110-2, 110-4, and 110-n can be microphones, sensor 110-3 can be a radio frequency identification (RFID) reader, sensor 110-7 can be a power sensor that indicates the operation of lights, and sensor 110-8 can be an infrared (IR) sensor. It should be clear that the types and locations of the sensors 110 in FIG. 1 are only exemplary and not limiting. Alternate or additional sensors 110 (e.g., accelerometers, cameras, contact sensors) to those shown in FIG. 1 can be part of a smart environment 100. In addition, the sensors 110 shown in FIG. 1 can be located in different parts of the smart environment 100 than what is shown in FIG. 1.

Each sensor 110 not only detects according to its type but also transmits when it detects. In the case of the microphones, the sensors 110 can continuously transmit the audio that they detect or transmit audio based on a different sensor 110 (e.g., motion sensor, IR sensor) indicating activity in the range of the microphones. In the exemplary smart home 101 shown in FIG. 1, the microphone sensor 110-2 is located in the laundry room near the washing machine 102, the microphone sensor 110-3 is located in the kitchen near a sink 103 and refrigerator 104, and the microphone 110-n is located in a bathroom near a tub 105. An exemplary actuator 120 is shown in FIG. 1. The exemplary actuator 120 controls water flow into the tub 105. The smart environment 100 can include any number of additional actuators 120 to control lights, the faucet for the sink 103, and other operations. The controller 210 is further discussed with reference to FIG. 2.

Figure 2:
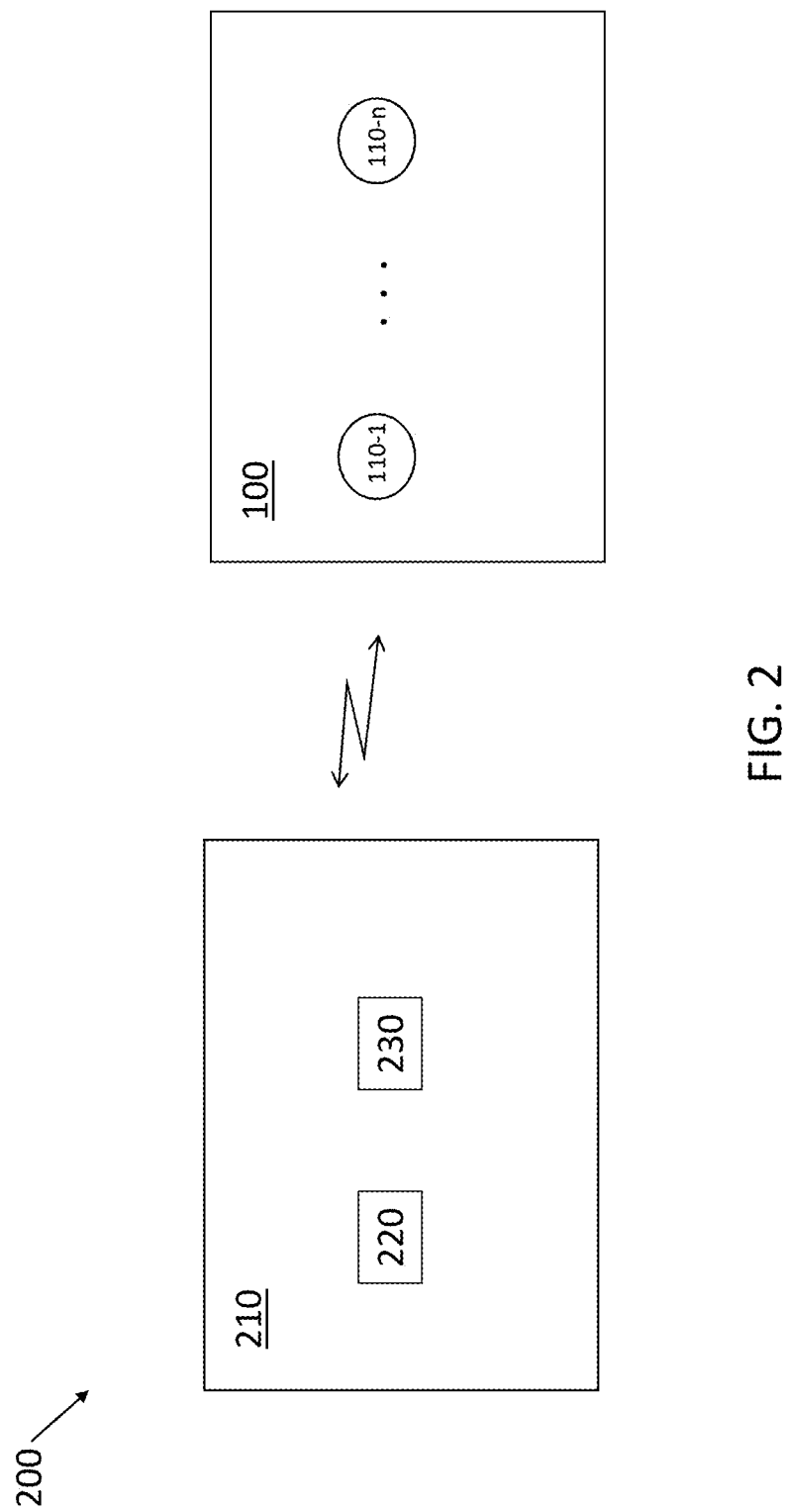
FIG. 2 is a block diagram of a system to perform liquid volume determination in order to affect the functionality of a smart environment according to one or more embodiments of the invention.

FIG. 2 is a block diagram of a system 200 to perform liquid volume determination in order to affect the functionality of a smart environment according to one or more embodiments of the invention. The system 200 includes the smart environment 100 and a controller 210 that is within or in communication with the smart environment 100. According to the exemplary embodiment shown in FIG. 1, the controller 210 is part of the smart environment 100 and receives transmissions from each of the sensors 110 in the smart environment 100. According to the exemplary embodiment shown in FIG. 2, the controller 210 can be remotely located from the smart environment 100 and obtains transmissions from the sensors 110 of the smart environment 100.

The controller 210 includes processing circuitry such as, for example, one or more memory devices 230 and processors 220 to store and execute a computer program product. The processing circuitry of the controller 210 can implement machine learning or a rule-based approach according to different embodiments of the invention. When a liquid is being poured—whether that liquid is water pouring into the washing machine 102, a beverage from the refrigerator 104 being poured, or water pouring into the tub 105—the controller 210 identifies the liquid, determines the volume poured, analyzes the scenario, and determines if an action should be initiated. Each of these is further discussed with reference to FIG. 3.

Figure 3:
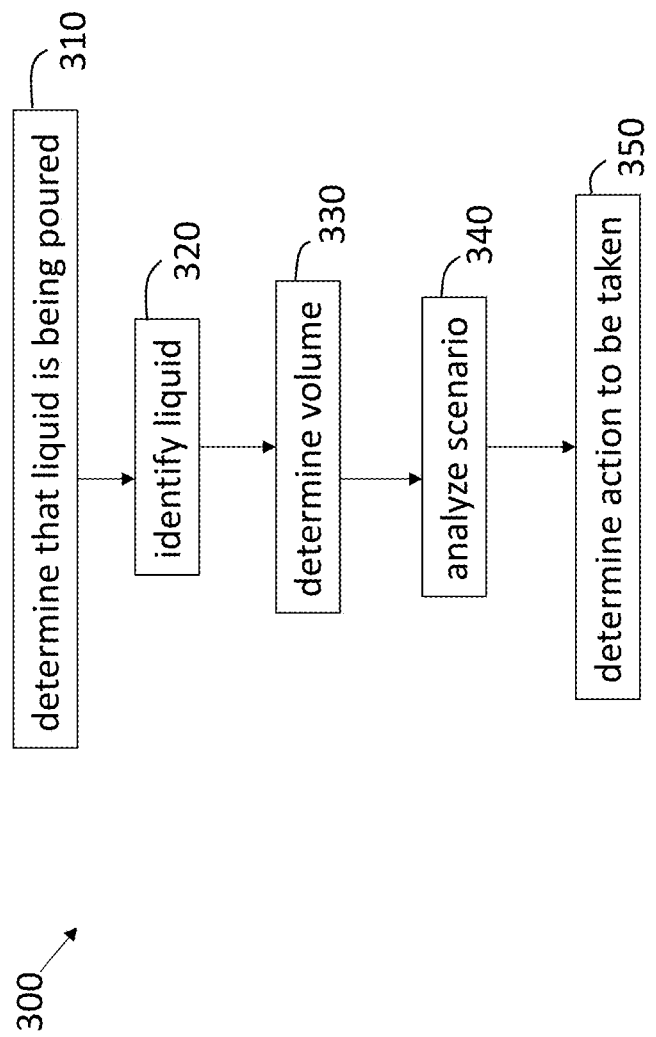
FIG. 3 is a process flow of a method of performing liquid volume determination in order to affect the functionality of a smart environment according to one or more embodiments of the invention.

FIG. 3 is a process flow 300 of a method of performing liquid volume determination in order to affect the functionality of a smart environment according to one or more embodiments of the invention. At block 310, determining that a liquid is being poured can be accomplished in a number of ways. According to an exemplary embodiment of the invention, sound analysis to discern the sound of liquid pouring, as determined from sensors 110 that are microphones, can trigger the determination. The sound signatures associated with pouring different liquids can be compared according to a mapping scheme or a machine learning approach can learn the different sound signatures. According to other embodiments of the invention, a sensor 110 that is an actuator (e.g., activates faucet) or analysis of information from another sensor 110 (e.g., image analysis from a camera) can facilitate determination that a liquid is being poured.

At block 320, identifying the liquid that is being poured can also be accomplished according to different embodiments of the invention. For example, in a smart environment 100 and, more specifically, a smart kitchen, sensors 110 can read barcodes of products (e.g., milk, juice) in the smart kitchen to narrow down or identify the liquid. Sound signature can then be used to confirm the identity of the liquid. Other sensors 110 (e.g., cameras) can be used to read a label on a container of the liquid according to alternate embodiments of the invention. When the sensors 110 include a radio frequency identification (RFID) reader, containers of liquids with RFID tags can be identified according to yet another embodiment of the invention.

Identifying the liquid, at block 320, can include identifying characteristics of the liquid, as well. The characteristics can be mapped to the liquid in the form of a look-up table, for example, or can be learned along with sound signatures in a machine learning process. Characteristics can include viscosity of the liquid, which can be used in the computation of volume (at block 330). Other characteristics of the identified liquid can include drinkability (e.g., milk, water), flammability (e.g., oil) that can be used in the determination of an action (at block 350).

At block 330, determining the volume of the liquid that is being poured is based on sound analysis. Information like the viscosity of the liquid can be used, along with the sound analysis, to determine a rate of pour. The rate of the pour and the duration of the pour can then be used to determine the volume of liquid. As previously noted, a mapping can be used such that, for a given viscosity, the frequency of sound sensed by the microphone can be mapped to a pour rate, or machine learning can be implemented to determine the pour rate and, consequently based on the duration of the pour, the pour volume.

At block 340, analyzing the scenario includes determining a context for the liquid being poured (e.g., a beverage being poured to drink, a bath tub 105 being filled, a washing machine 102 being operated). The determination of context can include a determination of which room of the smart house 101 or, more generally, the smart environment 100, the liquid is being poured in. For example, liquid being poured in the kitchen is more likely being poured for consumption than liquid being poured in the laundry room or in the bathroom. Also, liquid being poured in the bathroom is less likely to be flammable than liquid (e.g., oil) being poured in the kitchen or in a garage. This context information can then be combined with the identity of the liquid (from block 320) to determine the scenario (e.g., tub is being filled with water, oil is being poured into a pan on the stove).

At block 350, determining an action to be taken requires knowing the identity of the liquid (from block 320), knowing the liquid volume poured (from block 330), and the scenario (from block 340). In addition, a priori knowledge can also be required. For example, the capacity of the tub 105 or washing machine 102 and the smoking point of different cooking oils (i.e., temperature at which different types of cooking oil start to burn) can be known. The combination of all this information can then be used, based on a mapping or machine learning, to determine an action to be taken. The action can involve an actuator 120 in the smart environment 100. For example, if it is determined that water pouring into a tub 105 will overflow based on the volume (from block 330), the scenario (from block 340), and the a priori knowledge of the capacity of the tub 105, an actuator 120 coupled to the tub faucet can be controlled to turn off the water flow.

The action taken, at block 350, can first require obtaining additional information. For example, in the previously noted scenario of water flowing into a tub, even if an overflow scenario has not been reached, the determination, at block 350, can be that temperature of the water should be determined. This information can be used to issue an alert, for example. If oil is being poured into a hot pan, it may be determined, at block 350, that the temperature of the oil should be determined. This determination can lead to a further determination that the actuator 120 associated with the stove should be controlled to turn the stove off based on the oil reaches its smoking point.

In the smart environment 100, according to another embodiment of the invention, the absence of a liquid volume can also trigger action (at block 350). This type of rule-based on machine learning-based alert can be helpful when a person residing alone must be monitored remotely. For example, if water has not been poured into the tub 105 for more than a threshold number of days (e.g., 2 days), this can be interpreted (at block 340) as the lack of a bath in 2 days. As another example, if no beverage has been poured in the kitchen over a period of time (e.g., 12 hours), this can be interpreted (at block 340) as lack of hydration by an occupant of the smart environment 100. In this case, the determination (at block 350), can be to issue an alert to a caregiver. For example, the controller 210 can send an alert via a wireless (e.g., cellular) communication medium.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of performing liquid volume determination in a smart environment, the method comprising:
    determining that a liquid is being poured;
    identifying, using a processor, the liquid;
    determining, using the processor, the liquid volume of the liquid being poured based on sound analysis of audio sensed by a microphone;
    analyzing, using the processor, a scenario in which the liquid is being poured; and
    determining, using the processor, an action based on the scenario, wherein the action includes triggering an actuator of the smart environment, obtaining additional information about the liquid, or issuing an alert.

2. The computer-implemented method according to claim 1, wherein the identifying the liquid is based on an image of a container of the liquid obtained with a camera.

3. The computer-implemented method according to claim 1, wherein the identifying the liquid is based on reading a radio frequency identification (RFID) tag on a container of the liquid with an RFID reader.

4. The computer-implemented method according to claim 1, further comprising determining characteristics of the liquid based on the identifying the liquid, wherein the characteristics include viscosity of the liquid.

5. The computer-implemented method according to claim 1, wherein the determining the liquid volume based on the sound analysis includes determining how long the liquid is being poured.

6. The computer-implemented method according to claim 1, wherein the analyzing the scenario includes determining a type of room in which the liquid is being poured.

7. The computer-implemented method according to claim 1, wherein the triggering the actuator of the smart environment includes shutting off a faucet from which the liquid is being poured.

8. A system to perform liquid volume determination in a smart environment, the system comprising:
    one or more microphones in the smart environment; and
    a processor configured to determine that a liquid is being poured, to identify the liquid, to determine the liquid volume of the liquid being poured based on sound analysis of audio sensed by a microphone, to analyze a scenario in which the liquid is being poured, and to determine an action based on the scenario, wherein the action includes triggering an actuator of the smart environment, obtaining additional information about the liquid, or issuing an alert.

9. The system according to claim 8, wherein the processor is configured to identify the liquid based on an image of a container of the liquid obtained with a camera.

10. The system according to claim 8, further comprising a radio frequency identification (RFID) reader, wherein the processor is configured to identify the liquid based on reading a radio frequency identification (RFID) tag on a container of the liquid with the RFID reader.

11. The system according to claim 8, wherein the processor is further configured to determine characteristics of the liquid following identification of the liquid, wherein the characteristics include viscosity of the liquid.

12. The system according to claim 8, wherein the processor is further configured to determine the liquid volume based on the sound analysis by determining how long the liquid is being poured.

13. The system according to claim 8, wherein the processor is further configured to analyze the scenario by determining a type of room in which the liquid is being poured.

14. The system according to claim 8, wherein the processor is further configured to trigger the actuator of the smart environment to shut off a faucet from which the liquid is being poured.

15. A computer program product for performing liquid volume determination in a smart environment, the computer program product comprising a computer readable storage medium having program instructions embodied therewith, the program instructions executable by a processor to perform a method comprising:
    determining that a liquid is being poured;
    identifying the liquid;
    determining the liquid volume of the liquid being poured based on sound analysis of audio sensed by a microphone;
    analyzing a scenario in which the liquid is being poured; and
    determining an action based on the scenario, wherein the action includes triggering an actuator of the smart environment, obtaining additional information about the liquid, or issuing an alert.

16. The computer program product according to claim 15, wherein the identifying the liquid is based on an image of a container of the liquid obtained with a camera or on reading a radio frequency identification (RFID) tag on a container of the liquid with an RFID reader.

17. The computer program product according to claim 15, further comprising determining characteristics of the liquid based on the identifying the liquid, wherein the characteristics include viscosity of the liquid.

18. The computer program product according to claim 15, wherein the determining the liquid volume based on the sound analysis includes determining how long the liquid is being poured.

19. The computer program product according to claim 15, wherein the analyzing the scenario includes determining a type of room in which the liquid is being poured.

20. The computer program product according to claim 15, wherein the triggering the actuator of the smart environment includes shutting off a faucet from which the liquid is being poured.

\* \* \* \* \*